United States Patent Office 2,729,678
Patented Jan. 3, 1956

2,729,678

PHENYL HALO-SUBSTITUTED SALICYLAMIDE

Melville Sahyun, John A. Faust, and Leonard H. Jules, Santa Barbara, Calif., assignors to Sahyun Laboratories, Santa Barbara, Calif., a corporation of California No Drawing. Application February 12, 1953, Serial No. 336,645

5 Claims. (Cl. 260—559)

This invention relates to certain phenyl- and halogen-substituted salicylamides and is more particularly concerned with 3-phenyl-5-halo-salicylamide and N-substituted derivatives thereof.

The novel compounds of the present invention have utility as analgesics, having substantial central nervous system depressant activity, and are particularly effective because of their low toxicity, as well as being intermediates in the preparation of more complex organic compounds.

Specifically, the present invention contemplates the following compounds:

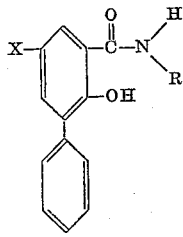

wherein X is selected from the group consisting of chlorine, bromine, and iodine, and wherein R is selected from the group consisting of hydrogen and lower-alkanol. Suitable lower alkanol residues include, for example, methanol, ethanol, propanol, isopropanol, butanol, pentanol, pentanol-3, hexanol, heptanol, octanol, et cetera.

The novel compounds of the present invention may be readily prepared by the reaction of a suitable 5-halo-3-phenylsalicylate with ammonia, or an aminoalkanol. The reaction is usually conducted by dissolving the salicylic ester in a suitable lower alkyl alcohol solvent, adding ammonia or an amino-substituted alkanol to the solvent solution, and allowing the mixture to stand until ammonolysis has been completed. The reaction may be conducted from zero to 100 degrees centigrade, preferably at about room temperature and usually requires up to fifteen days for completion; however, if a substantially complete reaction is not desired, less time may be utilized. The product may be recovered by adding a dilute solution of sodium bicarbonate to the solvent system, which will cause crystallization of the desired material. Recrystallization or other purification techniques will yield the purified compound.

The following examples are given to illustrate one method by which the compounds of the present invention may be prepared, however, they are not to be construed as limiting the invention thereto.

PREPARATION.—METHYL-5-BROMO-3-PHENYLSALICYLATE

A mixture of 58.6 grams (0.2 mole) of 5-bromo-3-phenylsalicylic acid, 31.6 grams (0.25 mole) of dimethylsulfate, 21 grams (0.25 mole) of sodium bicarbonate and 200 milliliters of acetone was stirred and refluxed for twenty hours. The solvent was removed by distillation, the residue diluted with 200 milliliters of water and the mixture extracted with ether. The ether extracts were combined, dried and the ether removed by distillation. The fraction boiling at 162–167 degrees centigrade at one millimeter of mercury pressure weighed 58.2 grams (95 percent of the theoretical yield) and melted at 67–68 degrees centigrade after recrystallization from dilute isopropanol.

Following the procedure of the above preparation, the corresponding methyl 5-chloro-3-phenylsalicylate, boiling at 156–160 degrees centigrade at one millimeter of mercury absolute, and melting at 77–78 degrees centigrade, after crystallization from isopropanol, and methyl 5-iodo-3-phenylsalicylate, melting at 72–74 degrees centigrade, as well as other alkyl esters of these salicylates may be prepared.

Example 1.—5-bromo-3-phenylsalicylamide

A mixture of 58.6 grams (0.2 mole) of 5-bromo-3-phenylsalicylic acid, 150 milliliters of N-butanol and five milliliters of concentrated sulfuric acid was refluxed until 4.6 milliliters of water was collected in a water separator. The reaction mixture containing N-butyl 5-bromo-3-phenylsalicylate, was then cooled, neutralized with fifteen milliliters of concentrated aqueous ammonia, fifty milliliters of methanol added, and the mixture saturated with ammonia at ice-bath temperature. After remaining in a pressure bottle at room temperature for ten days, the mixture was distilled to remove the solvent and excess ammonia, and 150 milliliters of dilute sodium bicarbonate was added to the viscous liquid residue. With warming, the oil solidified. This solid was collected by filtration, washed with water and recrystallized from about 800 milliliters of ethanol. There was thus obtained 38.4 grams (66 percent of the theoretical yield) of 5-bromo-3-phenylsalicylamide melting at 202–204 degrees centigrade, having a solubility of less than 0.5 percent in water at twenty degrees centigrade, and a pH in a saturated aqueous solution of 6.8.

*Analysis.*—Calculated: N 6.16. Found: N 6.14.

Example 2.—N-(beta-hydroxyethyl)-5-bromo-3-phenylsalicylamide

A mixture of 18.4 grams (0.06 mole) of methyl 5-bromo-3-phenylsalicylate, 36.6 grams (0.6 mole) of monoethanolamine, 75 milliliters of methanol and ten milliliters of water was allowed to remain at room temperature for thirteen days, diluted with 150 milliliters of water and acidified with hydrochloric acid. The solid product was dissolved in a mixture of chloroform and ethanol, treated with charcoal, filtered, and with the addition of heptane and gradual cooling, colorless needles, melting at 181–182 degrees centigrade, and weighing 152 grams (75 percent of the theoretical yield) separated. This material, N-(beta-hydroxyethyl)-5-bromo-3-phenylsalicylamide, is soluble in ethanol, has a solubility of less than 0.5 percent in water at twenty degrees centigrade, and a pH in a saturated aqueous solution of 5.72.

*Analysis.*—Calculated: N 4.17. Found: N 4.14.

Example 3.—5-chloro-3-phenylsalicylamide

Following the procedure of Example 2, methyl 5-chloro-3-phenylsalicylate was reacted with ammonia in methanolic solution to yield 5-chloro-3-phenylsalicylamide, melting at 190–191 degrees centigrade, as yellowish, non-hygroscopic crystals, having a solubility of less than 0.5 percent in water at twenty degrees centigrade and a pH in a saturated aqueous solution of 6.2.

*Analysis.*—Calculated: N 5.65. Found: N 5.59.

Example 4.—N-(beta-hydroxyethyl)-5-chloro-3-phenylsalicylamide

Following the procedure of Example 2, methyl 5-chloro-3-phenylsalicylate was reacted with aminoethanol in methanolic solution to prepare N-(beta-hydroxyethyl)-5-chloro-3-phenylsalicylamide, melting at 187 degrees centigrade, as feathery, white, non-hygroscopic needles, having a solubility of less than 0.5 percent in water at twenty degrees centigrade, soluble in alcohols. Its saturated aqueous solution has a pH of 4.65.

*Analysis.*—Calculated: N 4.80. Found: N 4.68.

*Example 5.—N-(delta-hydroxypentyl)-5-iodo-3-phenyl-salicylamide*

Following the procedure of Example 2, methyl 5-iodo-3-phenylsalicylate is reacted with 1-aminopentanol-4 in methanol and water, to yield N-(delta-hydroxypentyl)-5-iodo-3-phenylsalicylamide as a crystalline solid, slightly soluble in water, and having a pH in saturated aqueous solution of less than 7.0.

Various modifications may be made in the method of the present invention without departing from the spirit or scope thereof, and it is to be understood that we limit ourselves only as defined in the appended claims.

We claim:
1. A compound having the formula:

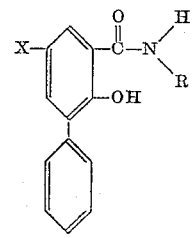

wherein X is selected from the group consisting of chlorine, bromine and iodine, and wherein R is selected from the group consisting of hydrogen and hydroxyl-loweralkyl containing up to eight carbon atoms.

2. 5-bromo-3-phenylsalicylamide.

3. N - (beta - hydroxyethyl) - 5 - bromo - 3 - phenylsalicylamide.

4. 5-chloro-3-phenylsalicylamide.

5. N - (beta - hydroxyethyl) - 5 - chloro - 3 - phenylsalicylamide.

No references cited.